United States Patent [19]

Parsons, Jr.

[11] 4,373,743
[45] Feb. 15, 1983

[54] WHEEL SUSPENSION SYSTEM FOR VEHICLES

[76] Inventor: Charles F. Parsons, Jr., 1760 Plymouth Ct., Wheaton, Ill. 60187

[21] Appl. No.: 208,855

[22] Filed: Nov. 21, 1980

[51] Int. Cl.³ .......................................... B62D 17/00
[52] U.S. Cl. ................................. 280/661; 180/73 R; 280/112 A; 280/675; 280/772
[58] Field of Search ............... 280/660, 661, 675, 772, 280/112 A; 180/73 R

[56] References Cited

U.S. PATENT DOCUMENTS

| | | | |
|---|---|---|---|
| 2,678,830 | 5/1954 | Cigan | 180/73 R |
| 2,978,255 | 4/1961 | Rosenkrands | 280/112 A |
| 3,598,385 | 8/1971 | Parsons | 280/112 A |
| 4,159,128 | 6/1979 | Blaine | 280/772 |

Primary Examiner—Joseph F. Peters, Jr.
Assistant Examiner—John A. Carroll
Attorney, Agent, or Firm—Edmond T. Patnaude

[57] ABSTRACT

Independently mounted wheel supports on opposite sides of a vehicle are respectively connected together and to the frame of the vehicle by a linkage connected between the upper and lower control arms of the wheel supports, and an automatic camber adjustment linkage is connected between the frame of the vehicle and the wheel supports for changing the camber of the wheels in response to a roll of the frame.

6 Claims, 4 Drawing Figures

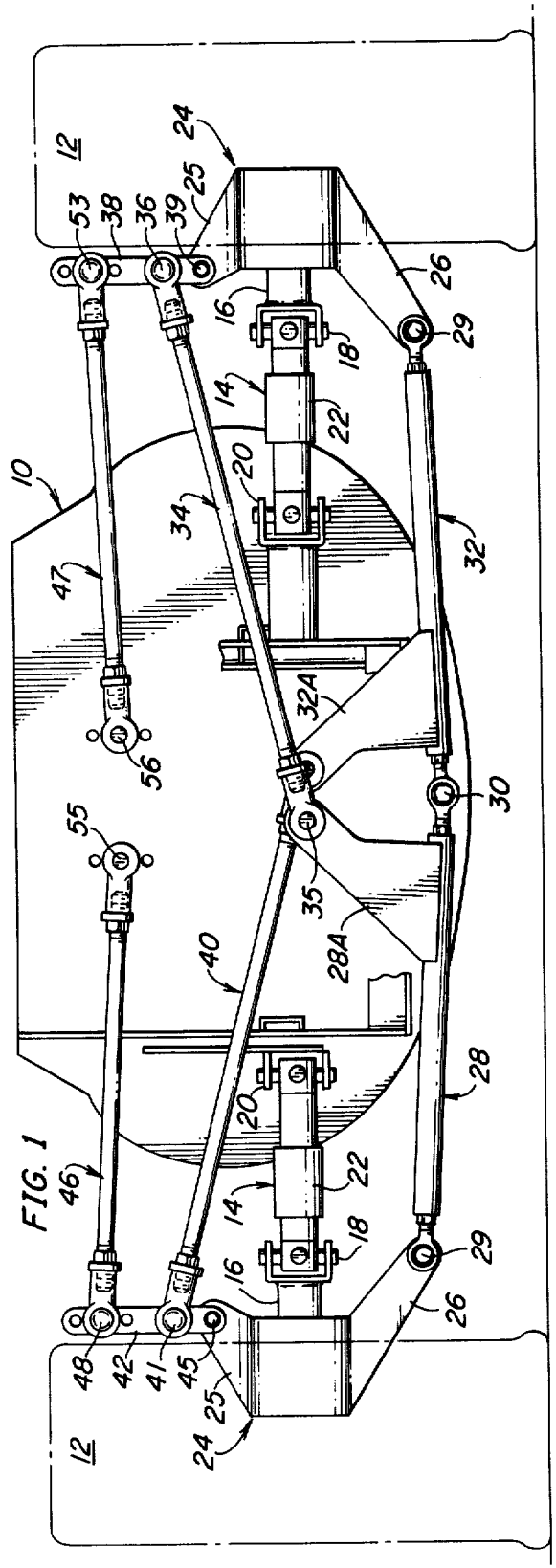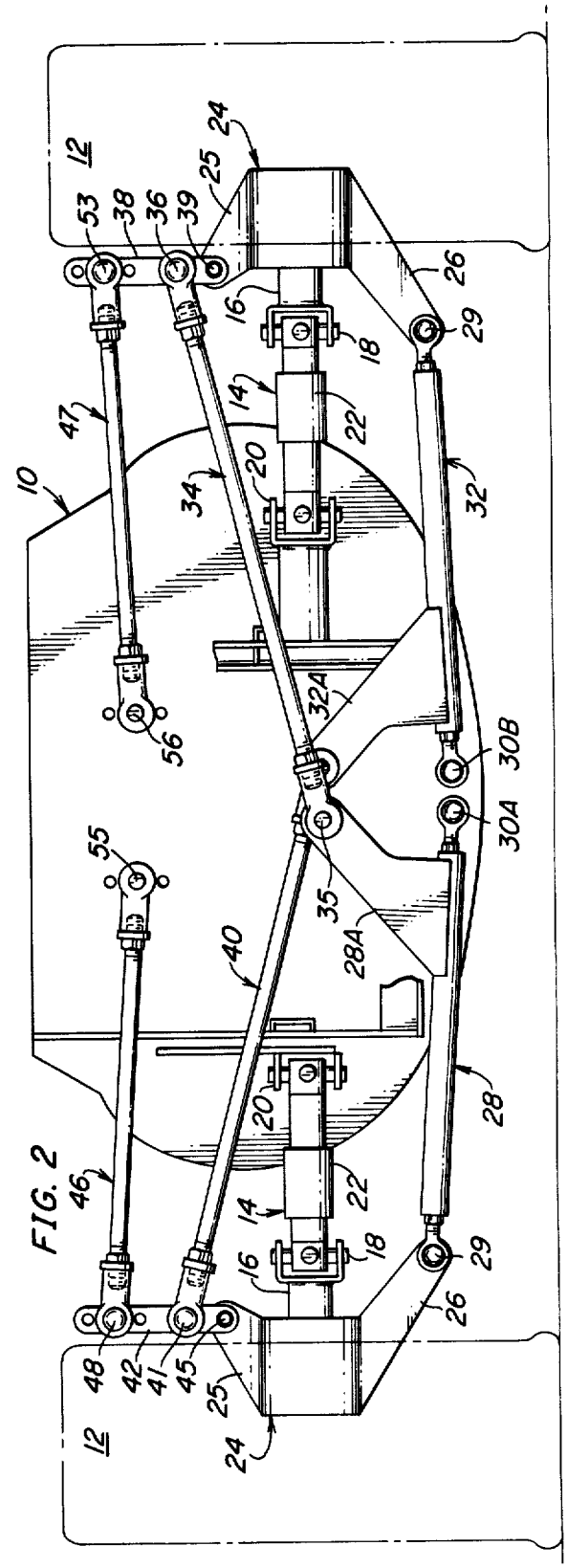

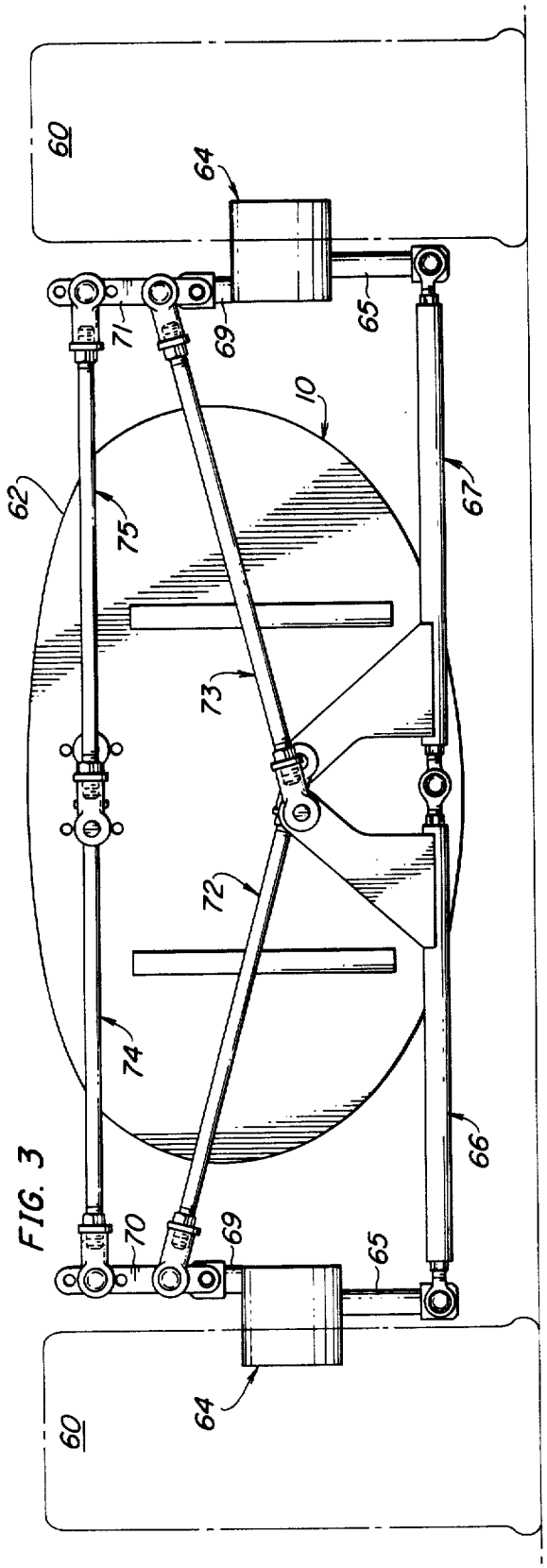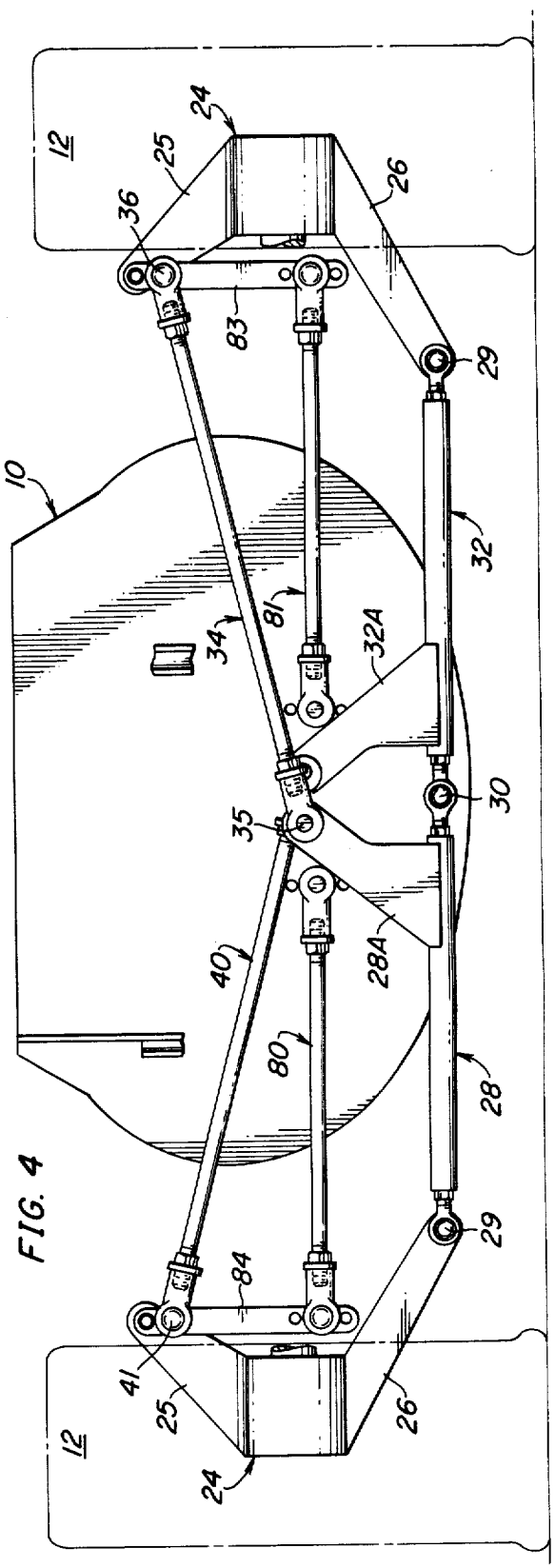

WHEEL SUSPENSION SYSTEM FOR VEHICLES

The present invention relates in general to wheel suspensions for vehicles, and it relates in particular to a new and improved suspension system which automatically causes a change in wheel camber during cornering of the vehicle.

BACKGROUND OF THE INVENTION

Many present day automotive vehicles and particularly racing cars employ tires having a low profile and a wide tread. During high speed turns of the type which are common in automobile racing, centrifugal force causes the vehicle to roll away from the turn which lifts the tires partly off the driving surface and results in uneven wear of the tires. More importantly, the partial lifting of the tires off the driving surface causes a loss of traction and a corresponding loss of control. This problem occurs with both solid axle and independent wheel suspensions although it is more severe in independent wheel systems.

In my earlier issued U.S. Pat. No. 3,598,385 there is disclosed an independent wheel suspension system wherein linkages are connected between the wheel supports on the opposite sides of the vehicle for maintaining full width contact between the tires and the driving surface irrespective of vertical movements of the chassis relative to the driving surface. The present invention, which enables the automatic adjustment of camber during cornering of the vehicle so as to maintain the full widths of the tires in engagement with the driving surface during high speed turns, is described hereinafter in combination with the linkage system described in my said patent, but the invention is not, in its broader aspects, limited to use with that system.

SUMMARY OF THE INVENTION

Briefly, there is provided in accordance with the present invention several new and improved linkage systems which connect the wheel supports of vehicles to vertically spaced positions on the body of the vehicle and causes a change in camber in response to a roll of the vehicle. When used in combination with the suspension system of U.S. Pat. No. 3,598,385, the minor links are connected to the upper central arms of the wheel supports by levers which are connected to the vehicle by camber control links which lie parallel to and are substantially equal in length to the major links. When the camber control links are pivotally connected to the vehicle at locations above the locations at which the major links are pivotally connected to the chassis, a roll of the vehicle will cause both of the wheels to lean into the turn, i.e. the camber of the outer wheel will become changed in a negative direction and the camber of the inner wheel will change in a positive direction. In this manner, a full width footprint is maintained during high speed cornering.

GENERAL DESCRIPTION OF THE DRAWING

The present invention will be better understood by a reading of the following detailed description taken in connection with the accompanying drawings wherein:

FIG. 1 is an end view partially schematic of a rear wheel suspension system embodying the present invention;

FIG. 2 is an end view, partially schematic of another rear wheel suspension system embodying the present invention;

FIG. 3 is an end view, partially schematic, of a front wheel suspension system embodying the present invention; and FIG. 4 is an end view, partially schematic of another front wheel suspension system embodying the present invention.

DESCRIPTION OF A PREFERRED EMBODIMENT OF THE INVENTION

In order to facilitate a better understanding of the camber control mechanism of the present invention, in the ensuing description of several embodiments of the invention, the manner in which the chassis is spring mounted and stabilized and the manner in which fore and aft movements as well as toe and steering are controlled are not described. However, it will be understood by those skilled in the art of wheel suspension design that the invention may be used with many, if not all well known systems for controlling fore and aft, toe and steering of the wheel supports and for spring mounting and stabilizing the chassis.

Referring to FIG. 1 of the drawing, reference character 10 indicates the body of a vehicle and the schematic illustration represents a relatively rigid structure comprising a chassis frame and a body attached thereto. The use herein of the term, frame, is intended to include the conventional chassis, the body, and/or any additional supports rigidly fixed thereto. Moreover, it should be understood that the suspension system of the present invention may be used with driven or non-driven wheels and with steerable and non-steerable wheels.

The body 10 is supported by four separate wheel assemblies 12 including suitable tires, only two of the assemblies 12 being shown in FIG. 1. The wheel assemblies 12 shown in FIG. 1 are driven wheels which are drivingly connected to the transmission of the vehicle by a pair of drive shafts 14 of conventional construction. The drive shafts 14 are respectively connected at the outer ends to stub axles 16 by means of universal joints 18. The axles 16 are fixedly connected to the wheel assemblies. The inner ends of the drive shafts 14 are respectively connected to a differential or other driving device by means of universal joints 20 thereby to permit independent vertical movement of the wheel assemblies while still providing a positive drive connection to the wheel assemblies. A pair of spline connectors 22 are respectively incorporated in the drive shafts 14 to permit changes in the effective lengths of the drive shafts 14 to permit independent movement of the wheel assemblies.

The wheel assemblies 12 are rotatably supported by wheel support structures 24 each having a central hub to which the associated axle 16 is connected and upper and lower control arms 25 and 26 rigidly connected to the hub. As is more fully described hereinafter, the suspension system of the present invention comprises a plurality of linkages which connect the control arms of the wheel support structures to one another and to the frame of the vehicle in such a way as to automatically change the camber of both wheel assemblies in response to rotational movement or roll of the frame of the vehicle.

Considering in detail the camber control suspension system shown in FIG. 1, a first major link 28 is connected at one of its ends to the control arm 26 by a ball-type connector 29. The other end of the link 28 is pivotably connected to the frame by a conventional ball-type connector 30. A second major link 32 is similarly connected at one end to the frame and at the other end to the lower central arm 26 of the other wheel support structure. The links 28 and 32 are thus pivotable relative to the frame in the vertical plane about the horizontal longitudinal axis extending through the centers of the aligned connectors 30 and to a lesser extent in the horizontal plane. However, as shown in the embodiment of FIG. 2, the two major links may be connected to the frame for pivotable movement relative to the frame about closely spaced horizontal axes 30A and 30B.

The major link 28 is provided with an upwardly extending arm 28A to which one end of a minor link 34 is pivotally connected at 35. The other end of the link 34 is pivotally connected at 36 to a lever arm 38 which is pivotally connected at 39 to the upper control arm 25 of the right hand wheel support structure 24 as viewed in FIG. 1. In like manner an upwardly extending arm 32A on the major link 32 is pivotally connected to a minor link 40 which is in turn pivotally connected at 41 to a lever arm 42, the lever 42 being pivotally connected at 43 to the upper control arm 25 of the left-hand wheel support structure 24 as viewed in FIG. 1.

In order to vary the camber angles of the wheels in response to a roll or rotational movement of the vehicle, a pair of camber control links 46 and 47 are respectively connected between the levers 42, 38 and locations on the frame vertically displaced from the axis or axes about which the the major links 28 and 32 are pivotable relative to the frame. As shown, the outer end of the link 46 is affixed to the lever 42 by means of a ball type connector 48, and the outer end of the link 47 is connected by a ball type swivel connector 53 to the lever 38. The inner ends of the links 46 and 47 are respectively connected to the frame by pivotable connections at 55 and 56. These latter connections may be made with bolts having bearing sleeves thereon. It will be seen that the levers 38 and 42 are provided with several spaced holes for use in adjusting the effective lever arm length. For the same reason, a plurality of drilled holes are provided in the frame for changing the positions at which the camber control links pivotably connect to the frame. Also, all of the links are provided with means enabling independent adjustment of the lengths thereof.

It may be seen from an inspection of FIG. 1 that as the body 10 rolls or rotates in a counterclockwise direction, as for example, while cornering at high speeds, the top of the left hand wheel will be moved out relative to the bottom while the top of the right hand wheel will be moved in relative to the bottom. This change in the camber of the two wheels occurs because of the fact that the major and minor links maintain the pivot axes of the connectors 29, 36 and 29, 41 in fixed relative positions as described in my said patent.

Referring to FIG. 3, there is shown a camber control suspension system of the present invention connecting a pair of steerable wheel assemblies 60 to a vehicle body 62. In this embodiment of the invention the wheel assemblies 60 are journaled for free rotation in the hubs of a pair of wheel support structures 64 having lower control arms 65 connected to the frame by major links 66 and 67 and upper control arms 69 connected via lever arms 70 and 71 and minor links 72 and 73 to the major links 66 and 67. A pair of camber control links 74 and 75 are pivotably connected at their outer ends to the respective levers 70 and 71 and at their inner ends to the frame of the vehicle.

Referring to FIG. 4, there is shown another wheel suspension system embodying the present invention wherein the cambers of the wheels is also changed in response to roll of the body of the vehicle but in directions opposite to that provided by the suspension systems shown in FIGS. 2, 3 and 4. In this embodiment, the wheel support structures and the major and minor links are the same as in the embodiment of FIG. 1, wherefore like parts are identified by the same reference characters. However, in the suspension shown in FIG. 1, the camber control arms 80 and 81 are connected to the upper control arms by first class levers 83 and 84 wherein the fulcrums are at pivot points 36 and 41 at the ends of the minor links 34 and 40, respectively, and the camber control links 80 and 81 are pivotally connected to the levers on the opposite sides of the fulcrums. As a consequence, when the body 10 rolls in a counterclockwise direction, as viewed in FIG. 4, the top of the left hand wheel 12 will move in relative to the bottom and the top of the right hand wheel 12 will move out relative to the bottom. This reverse camber restricts the roll of the vehicle whereby to minimize body roll during cornering.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. A wheel suspension system for a vehicle having a frame, comprising in combination,
    first and second wheel supports located on opposite sides of said frame and each having wheel mounting axle means thereon,
    two pairs of upper and lower links respectively having one outer end of said lower links pivotably attached to a lower portion of one of said wheel supports, and having the other ends of said lower links pivotably attached to said frame for pivotal movement relative to a fore and aft axis,
    the inner ends of said upper links being pivotably connected to a respective one of said lower links,
    first and second levers respectively and pivotably attached to an upper portion of one of said wheel supports,
    the outer ends of said upper links being respectively and pivotably attached to said levers, and
    first and second camber control links each pivotably attached at one end to said frame for pivotal movement about a fore and aft axis and pivotably attached at the other end to one of said levers.

2. A wheel suspension system according to claim 1 wherein
    the locations at which said camber control links are attached to said frame are above the locations at which said first and second links are attached to said frame.

3. A wheel suspension system according to claim 2 wherein
    said lower links and said camber control links are of equal length and the ones of said lower and camber control links on the same side of said frame are mutually parallel.

4. A wheel suspension system according to claim 3 wherein
said upper links are attached to said levers at locations between the locations at which said levers are attached to said wheel supports and to said camber control links.

5. A wheel suspension system according to claim 4 wherein
said camber control links are attached to said levers at locations below the points of attachment of said levers to said wheel supports.

6. A wheel suspension system according to claim 1 wherein
said camber control links are pivotably attached to said frame for pivotal movement about a common fore and aft axis.

* * * * *